United States Patent [19]

Allaire

[11] Patent Number: 5,106,797
[45] Date of Patent: Apr. 21, 1992

[54] REFRACTORY MATERIAL PRODUCED FROM RED MUD

[75] Inventor: Claude Allaire, Chicoutimi-Nord, Canada

[73] Assignee: Alcan International Limited, Montreal, Canada

[21] Appl. No.: 636,749

[22] Filed: Jan. 2, 1991

Related U.S. Application Data

[63] Continuation-in-part of Ser. No. 276,104, Nov. 23, 1988, abandoned.

[30] Foreign Application Priority Data

Nov. 26, 1987 [CA] Canada ............................... 552914

[51] Int. Cl.⁵ ................................................ C04B 35/10
[52] U.S. Cl. ................................... 501/155; 501/127; 501/128; 106/600; 264/66
[58] Field of Search ................... 501/155, 127, 128; 106/600; 264/66

[56] References Cited

U.S. PATENT DOCUMENTS

| | | | |
|---|---|---|---|
| 3,879,211 | 4/1975 | Klotz | 501/155 |
| 3,886,245 | 5/1975 | Bayer et al. | 501/155 |
| 3,985,567 | 10/1976 | Iwu | 501/155 |
| 4,368,273 | 1/1983 | Puskas | 501/155 |

Primary Examiner—Mark L. Bell
Assistant Examiner—Deborah Jones
Attorney, Agent, or Firm—Cooper & Dunham

[57] ABSTRACT

A process for producing a refractory material and to the material so-produced. The process comprises calcining red mud obtained as a by-product of the Bayer process of producing alumina, grinding the calcined product to form particles of −4 Tyler mesh, mixing the ground product with a binder (e.g. colloidal silica, colloidal alumina, sodium silicate or sodium aluminate) and sufficient water to produce a formable mixture. The mixture is then formed into a desired shape and fired, preferably after curing and drying. The resulting fired products have good resistance to high temperatures and to corrosive chemicals such as cryolite. Consequently, the products can be used as refractory linings for aluminium production cells, and in similar applications.

21 Claims, 1 Drawing Sheet

REFRACTORY MATERIAL PRODUCED FROM RED MUD

CROSS REFERENCE TO RELATED APPLICATION

This application is a continuation-in-part of applicant's copending U.S. patent application Ser. No. 07/276,104, filed Nov. 23, 1988 now abandoned

BACKGROUND OF THE INVENTION

1. FIELD OF THE INVENTION

This invention relates to refractory materials and to a process for producing such materials from red mud. More particularly, the invention relates to such refractory materials which are suitable for use as cell linings in aluminum production cells.

2. DESCRIPTION OF THE PRIOR ART

Red mud is a by-product of alumina production processes and it is often discarded as waste, but this is economically and environmentally disadvantageous. Many attempts have been made over the years to find a use for red mud but none has proved to be particularly satisfactory. For example, since red mud contains a large proportion of iron oxide, attempts have been made to smelt the mud for the recovery of iron but without commercial success.

British patent 1,491,432 published on Nov. 9, 1977 in the name of Chemokomplex Vegyipari Gép-És Berendezés Export-Import allalat et al, discloses the use of red mud for the production of shaped ceramic products. This is achieved by mixing the red mud with silica, silicates or similar materials, or dolomite to the extent of 10–49% by weight (on a dry weight basis), shaping the resulting mixture and then firing it at 950°–1250° C. However, the resulting materials are not satisfactory for applications involving alkaline and fluorine corrosion at high temperature, such as cell linings for aluminum production cells where cryolite components, mainly NaF, are involved. Moreover, the products have a tendency to shrink during firing and thus may crack.

SUMMARY OF THE INVENTION

It is therefore an object of the present invention to utilize red muds to form high temperature and cryolite-resistant refractories suitable for use as linings in aluminum production cells.

According to one aspect of the invention there is provided a process for producing a refractory material, which comprises: calcining red mud; grinding the product following calcination to the −4 Tyler mesh range; mixing the ground product with a binder and sufficient water to produce a formable mixture; forming the mixture into a desired shape; and firing the shaped product to produce said refractory material.

The invention also relates to the refractory materials produced by the process and to the formable mixtures produced as intermediate products.

DETAILED DESCRIPTION OF THE INVENTION

Figure 1:
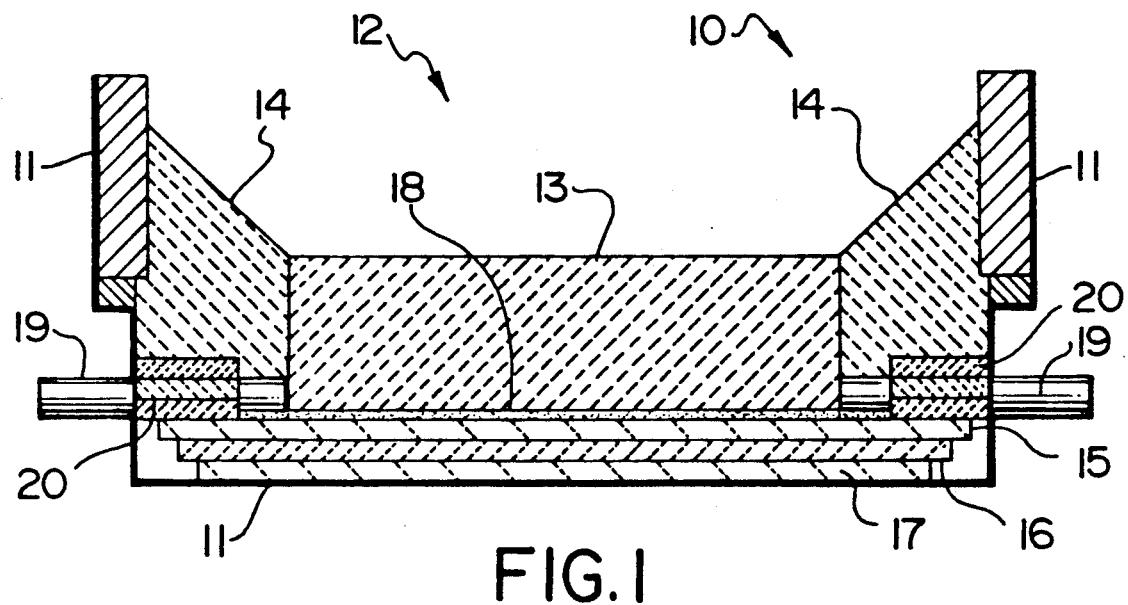
FIG. 1 is a cross-section of an aluminum reduction cell having a lining comprising refractory red mud products according to the invention.

The binder is normally a silica- and/or alumina-containing particulate material that is capable of producing a formable mixture of satisfactory rheology and good binding properties when mixed with the calcined red mud particles and water. Moreover, the binder should also be such that suitable stable cryolite-resistant mineral phases are produced in the final fired product. Desirably, the binder is somewhat acidic because this advantageously reduces the basicity of the calcined red mud and improves the bonding properties of the mixture upon firing. If necessary, an acid or a base may be added to adjust the pH to the desired level.

Suitable binders include colloidal silica, colloidal alumina, sodium silicate and sodium aluminate. These materials are all readily commercially available and any commercial product may be employed. In the case of colloidal silica, the product produced from fume silica is preferred and SKW produces a suitable form of fume silica for this purpose. Colloidal alumina in the form of a liquid suspension (20 wt % alumina in about 80 wt % water) can be obtained from Nyacol of Valley Forge, Pa. under the trade mark NYACOL Al/20. Colloidal alumina in the form of dry powder can be obtained from Vesta Chemical Co. of Ponca City, Okla. under the trade mark CATAPAL. Sodium silicate of various $Na_2O/Si_2$ ratios can be obtained from numerous suppliers, as can sodium aluminate.

The refractory products produced by at least the preferred forms of the inventive process are resistant at high temperatures to corrosion by alkaline materials and fluorides in oxidizing or reducing conditions. Indeed, as will be explained more fully later, certain forms of the products densify when exposed to such corrosive compounds (mainly sodium compounds) instead of being deteriorated. After such densification, the products are particularly resistant to dissolution by cryolite, mainly because of their low porosities.

Although the composition of red mud varies somewhat depending upon the source of bauxite and the processing conditions, a wide range of Bayer red muds can be used in the present invention. As will be explained more fully later, some of the red muds may benefit from the addition of compounds (e.g. alumina) so that nepheline ($NaAlSiO_4$) will be the main silicate phase produced on firing.

The analyses (on a dry weight basis) of some typical Bayer red muds are given in Table 1 below:

TABLE 1

| COMPONENT | Red Mud from mixed BOKE and TROMBETAS bauxite % by wt | Red Mud from JAMAICAN bauxite % by wt | Red Mud from BOKÉ bauxite % by wt |
|---|---|---|---|
| $Al_2O_3$ | 20 | 12 | 20 |
| $Fe_2O_3$ | 33 | 48 | 24 |
| $TiO_2$ | 6 | 7 | 18 |
| $SiO_2$ | 17 | 5 | 7 |
| $Na_2O$ | 9 | 3 | 4 |
| CaO | 5 | 6 | 6 |
| Loss on ignition at 1000° C. | 9 | 8 | 10 |
| Other | 1 | 11 | 11 |

Before use in the process described above, some pretreatment of the red mud may be desirable, although the need for such a pre-treatment and the type of pre-treatment to be carried out depends on the red mud composition, the type of binder used and the product properties to be achieved.

Red mud normally contains sand (mainly silica) and soluble materials (e.g. NaOH, $Na_2CO_3$ and $Na_2SO_4$) which contribute to the material basicity, and pre-treatment may be required to vary the contents of these materials. For example, for red muds having an $Al_2O_3$ to $SiO_2$ ratio lower than about 1–1.5:1 (on a weight basis), it may be necessary to remove at least some of the sand (e.g. by filtering the red mud) to avoid the generation of free silica during the firing step and hence to provide good resistance to cryolite. It may also be necessary to wash the red mud in order to remove some of the soluble basic materials, for the following reasons.

The quantity of soluble materials in red mud contributing to material basicity is referred to as the "TTS" (total titrable soda) content. Typically, the TTS content of red muds is up to 10 % by wt (on a dry basis). When employing red muds of low TTS content (e.g. below 1.5 % by wt), and using binders such as colloidal silica (fume silica) or colloidal alumina, washing of the red mud may be required in order to reduce the basicity of the mixture sufficiently to permit the gelling of the binder necessary for the formation of a shapable intermediate product prior to firing. On the other hand, when employing red muds of high TTS content (e.g. 1.5 to 10% by wt), no washing may be required because the calcined red mud may then contain sufficient reactive $Na_2O$ to produce from binders such as colloidal silica or colloidal alumina cementing compounds such as sodium silicate or sodium aluminate, respectively.

After the pre-treatment steps of sand removal and washing, if required, the main process steps are carried out.

The steps of calcining and grinding the red mud result in the formation, after the firing step, of refractory products which can resist harsh environments, such as those encountered in aluminum production cells, and which are resistant to cracking. The grinding step has the effect of providing fired products of desirable specific surface areas and densities. The calcination step has the effect of pre-shrinking the red mud so that, during the firing step, shrinkage is generally less than 1% by volume and cracking is reduced. The calcination step also has the effect of removing the combined water and of modifying the sodium salts included in the Bayer sodalite (which is a main constituent of red muds and is a compound consisting mainly of $Al_2O_3$, $SiO_2$ and $Na_2O$, but sometimes also containing $Na_2CO_3$ and $Na_2SO_4$). After calcination, the red mud particles include nepheline ($NaAlSiO_4$) which is the main silicate phase so produced. Based on the ternary $Na_2O$-$Al_2O_3$-$SiO_2$ phase diagram, reaction products of nepheline and $Na_2O$ (the major source of corrosion of the potlining in aluminum production cells) lead to the formation of eutectic compounds having melting points higher than 915° C. Moreover, it has been found that by starting with a red mud of a sufficiently high alumina content (i.e. one containing at least about 10% more than the quantity of alumina which becomes combined in the nepheline in the calcined product), or by supplementing the alumina content of low-alumina red mud to form a starting material of similar high alumina content, it can be ensured that nepheline will be formed predominantly as the silicate phase and that the reaction products will then remain in the solid state until temperatures reach at least 955° C. The added alumina, when employed, is preferably in the form of particles of −65 Tyler mesh and can be added to the red mud either before or after the calcination step. In the latter case, the alumina becomes incorporated into the nepheline during the final firing step.

The calcination is generally carried out in air at a temperature and for a time suitable to bring about the changes indicated above. Preferably, the calcination is carried out at a temperature in the range of about 900°–1400° C. and more preferably 1,000° to 1,200° C., for a time of about 5 to 10 hours. Following calcination, the red mud is cooled and then ground to the −4 Tyler mesh range. The particular granulometry within this range can be selected (e.g. by screening) to produce a product after firing of the density and specific surface area desired for the purposes which will be apparent later.

Following grinding, the particulate product is mixed with the binder, and preferably sufficient water, to produce a formable mixture.

The binder can be added to the calcined red mud as a dry powder followed by water addition, or the binder may be premixed with water and then mixed with the red mud particles. In the latter case, further water addition may or may not be necessary in order to give a product of the desired formability.

The amount of binder employed usually falls within the range of 2 to 8% solids by weight based on the dry weight of the calcined product. The amount of binder employed controls the mechanical properties of the final product (see Example 5 below). The amount of water employed depends upon the forming process to be employed and should be just enough to give the mixture the proper consistency required for the forming process.

In addition to the binder, other additives may be mixed with the calcined red mud. As noted above, it may be desirable to add alumina to increase the overall alumina content of the product to at least about 10% more than that which becomes combined in the nepheline in the fired product. This may be achieved simply by using colloidal alumina as a binder, but further alumina may be added (not necessarily in colloidal form but generally of −65 Tyler mesh size) if desired. Other additives may be used to improve sintering on firing or resistance to chemicals. Examples of such other additives are sodium oxide, aluminum fluoride, sodium fluoride, sodium carbonate and sodium sulfate. Sodium carbonate and sodium sulfate can improve sintering during firing and also act as a source of $Na_2O$ which may be required for reasons explained later.

It is most desirable that the resulting mixture should contain at least (and preferably more than) 90% by weight of red mud. That is, the amount of binder and additives (excluding water) mixed with the red mud should preferably total no more than 10% by weight of the mixture (on a solids basis) prepared for firing.

The resulting mixture can be formed prior to firing into any desired shape (e.g. tiles, bricks or slabs) by well-known means such as pressing, casting (with or without vibrating), extrusion or injection moulding. Following shaping in this way, the product is preferably cured at room temperature for up to about 24 hours, dried e.g by heating to 110°–120° C. for about 24 to 48 hours and is finally fired at 900°–1400° C., and preferably at 1000° C.−1200° C., for about 5 to 10 hours.

As an alternative to the formation of fired refractory products of predetermined shapes, the mixtures of ground calcined red mud and binder may be produced and sold as monolithics, which include mortars and castables. The purchaser may then use the monolithics by ramming or tamping them into place, or by casting them into desired shapes, followed by curing, drying and firing the mixture in the manner indicated above. The mixtures sold for this purpose need not contain water since the purchaser can add water immediately prior to their use.

The fired products produced by the invention can be used for a variety of purposes requiring high temperature resistant materials, but are particularly suited for use in the linings of aluminum production cells because of their high resistance to the extremely corrosive cryolitic species present in such cells.

Improved insulating properties can be imparted to the fired products of the invention by including heat-consumable particles, e.g. polystyrene spheres, etc., into the mixtures of calcined red mud particles and binder. During the firing step, the particles are consumed, leaving a foam-like insulating, light-weight refractory structure. For example, the thermal conductivity of the product may be reduced to around 0.15 w/m° C. by adding less than 5% by weight of polystyrene spheres to the starting raw materials.

It has unexpectedly been found that a particular group of the fired products of the invention exhibit "self-densification" (i.e. a substantial reduction of porosity) when exposed to solid cryolite, cryolite-NaF mixtures or other source of sodium such as NaCl at a temperature of around 850° C. or above, e.g. when used in an aluminum production cell. The particular group of the fired products includes all those having the following ratio between 0.05 and 1, exclusively (i.e. those products for which $0.05 < R < 1$):

$$R = \frac{Na_2O}{SiO_2} \cdot S$$

wherein:
- $Na_2O$ = the molar fraction of $Na_2O$ in the product originating from the decomposition of the soluble salts in the red mud during calcination (which is approximately 0.8 TTS wt % of the calcined red mud fraction in the product) and from the binder (e.g. if sodium silicate is used) and/or from additives such as $Na_2CO_3$ and $Na_2SO_4$.
- $SiO_2$ = the molar fraction of $SiO_2$ in the product originating from the binder when a siliceous binder is used (e.g. colloidal silica, fume silica or sodium silicate);
- S = the ratio of specific surface area (SSA) of the calcined red mud particles to the maximum SSA value which is obtained from the −65 mesh material (the finer material in the product), i.e. S=1 if 100% of −65 mesh particles are used.

In contrast, products of the invention having an R ratio equal to 0.05 or less or 1 or more do not self-densify at any temperature.

Those products for which $0.05 < R < 1$ can achieve porosities of 10% or less upon exposure to solid cyrolite at temperatures around 850° C. or higher. For given values of $Na_2O$ and $SiO_2$, the ratio R can be adjusted as required by controlling the specific surface area (SSA) of the calcined red mud particles. The maximum SSA is achieved by using only −65 Tyler mesh calcined red mud particles. Lower SSA are achieved from a granulometric distribution of calcined red mud including coarser particles (e.g. a mixture of the following fractions: −4+10, −10+28, −28+65 and −65 Tyler mesh). Alternatively, the R ratio can be adjusted by varying the amount of binder ($SiO_2$) and/or by adding $Na_2O$-rich additives (e.g. $Na_2CO_3$, $Na_2SO_4$ etc) to the red mud before or after calcination.

If it is desired to make $R \leq 0.05$, this can normally be done by:
(a) washing the mud
(b) using coarse red mud particles
(c) using higher silica binder contents.

If it is desired to make $R \geq 1$, this can normally be done by:
(a) using unwashed high TTS content red muds or by using low TTS content red muds plus additives such as $Na_2CO_3$ and $Na_2SO_4$
(b) using only −65 Tyler mesh particles (S=1)
(c) using lower silica binder contents.

It will be noted that the above definition of the R ratio is for those cases in which a siliceous binder is used. When colloidal alumina is used as the binder, it is believed that self-densifying products can also be formed but the values of the corresponding R ratio and the temperature at which self densification takes place may be different.

Self-densification appears to result from a filling of the pores of the product by sodium components. These sodium components then appear to become linked to the nepheline ($NaAlSiO_4$) matrix of the product and thus increase the density of the product without causing any shrinkage. The self-densification effect reduces the porosity of the product, which is particularly advantageous when the refractory product is used in aluminum production cells because attack by the cell contents is thereby substantially reduced.

The products of the invention can be used to line the entire cell (or "pot") of aluminum production cells, including the protective barrier, the intermediate and the insulating layers. The protective barrier may utilize the products for which $0.05 < R < 1$ which will self-densify upon sodium absorption (mainly NaF) from the cryolitic bath. If desired, those products could be densified prior to installation by pre-exposing them to solid cryolite (or other source of sodium) at more than about 850° C. The intermediate and insulating layers may involve the products for which $R \leq 0.05$ or R24 1. Those products cannot densify upon sodium component absorption, at any temperature, and could give a thermal conductivity of both layers of around 0.35 to 0.55 w/m° C. (about 3 times less than the densified products). However, even the insulating layer may comprise the products for which $0.05 < R < 1$ if they are not exposed to temperatures above about 850° C. In such cases, densification will not proceed in that layer and thermal conductivity of the products will still fall in the above range. If required, the insulating layer can involve the light-weight modified products, for even better insulation.

An example of an aluminum reduction cell having a lining comprising refractory material according to the present invention is shown in cross-section in FIG. 1 of the accompanying drawings.

The cell 10 comprises a metallic container 11 for holding molten cell components (not shown). The lining (indicated generally at 12) consists of a layer 13 of carbon blocks continuous with side layers 14 made of a carbon monolithic mix and three layers 15, 16 and 17 of red mud refractory material according to the present invention beneath the carbon layer. The upper layer 15 is a red mud self-densifiable product, the layer 16 is a red mud non-densifiable product and the lower layer 17 is a light weight modified red mud product. A thin layer 18 of alumina powder separates the red mud layer 15 from the carbon layer 13. Cathodes 19 project into the cell from each side and additional layers 20 of red mud refractories may be provided around the points of entry.

Figure 2:
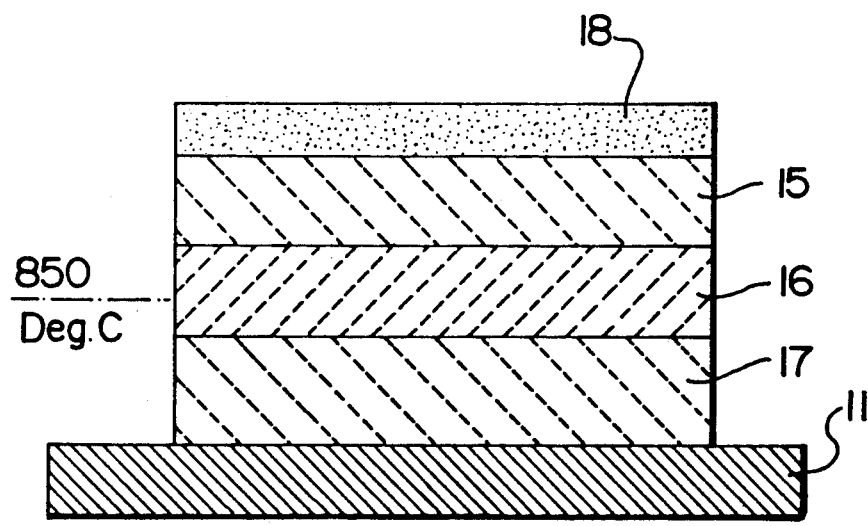
FIG. 2 is an enlarged cross-section of part of the lining shown in FIG. 1.

FIG. 2 is an enlarged cross-section of a part of the lining 12 showing the position of the 850° C. isotherm during normal use of the cell. Layer 15 acts as a protective layer, layer 16 as an intermediate layer and layer 17 as an insulating layer.

The following Examples illustrate the invention in further detail, but should not be regarded as limiting the scope of the invention in any way.

EXAMPLE 1

The following procedure was carried out to demonstrate the self-densification property of products made from red mud of low TTS content.

Samples were prepared by removing sand from red mud, washing the mud to reduce the TTS content to 0.5 wt % (on a dry basis) filtering it, calcining it at 1000° C. for five hours (which gave the chemical and mineralogical composition shown in Table 2 below), grinding it to specific particle sizes and then mixing it with 4% by weight of fume silica (−65 Tyler mesh) and water to form a mixture containing about 34% by weight of water. The mixture was shaped by pressing at 4000 psi small cylindrical pieces having a diameter of about 3.84 cm and a height of about 2.5 cm, dried and then fired at 1000° C. for five hours.

The samples were exposed to 60:40% by weight cryolite-NaF mixture for five hours at temperatures from 850° C. to 880° C. (the mixture being in the solid state at these temperatures).

TABLE 2

Chemical and mineralogical compositions of the calcined red mud used, after sand removal, washing and filtering

| | COMPOSITION (in wt) |
|---|---|
| Chemical Constituents | |
| $Fe_2O_3$ | 30% |
| $Al_2O_3$ | 22% |
| $SiO_2$ | 19% |
| $TiO_2$ | 7% |
| $Na_2O$ | 10% |
| CaO | 1% |
| Others | 11% |
| Mineralogy | |
| Hematite ($Fe_2O_3$) | Major* |
| Nepheline ($NaAlSiO_4$) | Mean* |
| Pseudo Brookite ($Fe_2TiO_3$) | Mean* |
| Others | Trace* |

*With respect to the relative peak intensities recorded on the spectrum from XRD analysis.

The results are summarized in Table 3 below.

TABLE 3

Degree of Densification of products made from red mud of low TTS content in Solid 60:40 Wt % Cryolite-NaF Mixture, at Various Temperatures, with respect to their "R" ratio value.

| Granulometric Distribution | Wt. % of particles of indicated sizes | |
|---|---|---|
| | R = 0.10* | R = 0.03* |
| −10 + 28 mesh | 0 | 40 |
| −28 + 65 mesh | 0 | 27 |
| −65 mesh | 100 | 33 |
| S** | 1.0 | 0.33 |
| Treatment Temperatures | % Loss in Porosity | |
| 850° C. | 2 | 2 |
| 860° C. | 2 | 0 |
| 870° C. | 40 | 10 |
| 880° C. | 75 | 5 |

*$R = \frac{Na_2O}{SiO_2} \cdot S = \frac{(0.8\ TTS)\ S}{SiO_2}$

**Based on calculation.

The samples having the higher R ratio value (R=0.1, which is in the range of 0.05<R<1), i.e. those produced from the finer particles, exhibited densification by sodium absorption at temperatures above 860° C. At 880° C., a 75% reduction in porosity took place in one sample. This resulted in a final porosity of less than 10%. This is lower than the porosity of most commercial refractories which is normally at least 15% and more generally between 20 and 25%.

Samples having the R ratio value near 0 (R=0.03), i.e. those produced from coarser red mud particles, did not exhibit significant densification at any temperatures.

EXAMPLE 2

The following procedure was carried out to demonstrate the self-densification property of products made from red mud of high TTS content.

Samples were prepared by removing sand from red mud but without washing it to keep its original TTS content after the Bayer circuit (varying between 2.5 and 2.9 wt % (on a dry basis)). Then the mud was filtered, calcined at 1000° to 1100° C. for 5 to around 10 hours, ground to obtain specific particles sizes and finally mixed with 2 to 6 wt % fume silica (−65 Tyler mesh) and enough water (between 20 to 30 wt % of the dry mixture) to be shaped by vibration casting into molds. The samples were exposed to the same cryolithic mixture than in Example 1, at 880° C. for 24 hours.

The results are summarized in Table 4. Self-densification took place for each sample, their "R" ratios being within the range 0.05<1.

TABLE 4

Degree of Densification of products made from red mud of high "TTS" content, in solid 60:40 wt % cryolite-NaF mixture, at various temperatures, with respect to their "R" ratio value in the range 0.05 < R < 1.

| PRODUCT COMPOSITION | 1 | 2 | 3 | 4 | 5 |
|---|---|---|---|---|---|
| −4 +10 mesh | 22% | 0% | 37% | 37% | 0% |
| −10 +28 mesh | 34% | 4% | 26% | 26% | 0% |
| −28 +65 mesh | 14% | 27% | 9% | 9% | 0% |
| −65 mesh | 30% | 69% | 27% | 27% | 100% |
| Silica fumes | 4% | 6% | 4% | 2% | 4% |
| TTS | 2.9% | 2.7% | 2.5% | 2.5% | 2.5% |
| S* | 0.18 | 0.70 | 0.14 | 0.14 | 1.0 |
| R** | 0.10 | 0.25 | 0.07 | 0.14 | 0.5 |
| Lost in porosity | 33% | 19% | 34% | 23% | 45% |

TABLE 4-continued

Degree of Densification of products made from red mud of high "TTS" content, in solid 60:40 wt % cryolite-NaF mixture, at various temperatures, with respect to their "R" ratio value in the range 0.05 < R < 1.

| PRODUCT COMPOSITION | 1 | 2 | 3 | 4 | 5 |
|---|---|---|---|---|---|
| @ densification | | | | | |

*Based on calculations $$**R = \frac{Na_2O}{SiO_2} \cdot S = \frac{(0.8\ TTS)\ S}{SiO_2}$$

EXAMPLE 3

The same sample submitted to the test described in Example 1, showing the highest densification (e.g. a reduction of 75% of the initial porosity after 5 hours at 1000° C.) was then contacted with liquid cryolite and exhibited very good stability. Indeed, the corrosion was much less than for a medium duty firebrick subjected to the same conditions, and no eutectic liquids as reaction products were observed.

EXAMPLE 4

Samples made by the same procedure as in Example 1, but shaped by vibration casting in 22.86×11.43×6.35 cm standard molds, were exposed to liquid aluminum for 5 hours at 900° C. Compared to a medium duty firebrick tested in the same conditions, the stability of the product was better.

Also, similar samples were tested in Al-5 wt % Mg for 96 hours and compared to 18 aluminosilicate castables ranging from 38.61 to 82.50 wt % in alumina content. Based on the extent of wettability, penetration and chemial reactions by the alloy, the resistance to corrosion of the samples were classified from 1 to 6 (i.e. good resistance to no resistance, respectively). Only 26% of the overall samples tested were classified no. 1, including the red mud product.

EXAMPLE 5

The following procedure was carried out to demonstrate the effect of binder content on the physical properties of the red mud products.

Samples were prepared according to Example 2 and tested for their bulk density, apparent porosity, cold crushing strength and room temperature thermal conductivity. The results are summarized in Table 5.

Upon increasing the amount of fume silica from 2 to 8 wt %, the product cold crushing strength and thermal conductivity increased from 6.7 to 26.1 MPa and from 0.46 to 0.63 W/mk, respectively.

TABLE 5

Effect of fume silica binder content on the physical properties of the red mud products

| Products Composition, wt % | | | | |
|---|---|---|---|---|
| Red mud | 98 | 96 | 94 | 92 |
| Fume silica | 2 | 4 | 6 | 8 |
| Physical Properties | | | | |
| Bulk density, g/cm³ | 1.62 | 1.63 | 1.69 | 1.74 |
| Porosity, % | 45 | 40 | 38 | 37 |
| Cold crushing strength, MPa | 6.7 | 14.8 | 21.0 | 26.1 |
| Room temperature thermal conductivity, W/mk | 0.46 | 0.50 | 0.55 | 0.63 |

EXAMPLE 6

During the dry mixing step of samples made by the same procedure as in Example 2, using 4 wt % fume silica, 1 wt % polystyrene spheres of less than 2 mm in diameter were added. The results of thermal conductivity tests showed a reduction of around 35 % compared to products free of that additive.

EXAMPLE 7

The following gives some examples of red mud from Brazilian, Japanese and Australian plants (see Table 6) that may not need sand removal nor alumina addition to convert them into refractory products which can meet the chemical requirements for use in potlining of alumina reduction cells at temperatures up to 955° C.

Each of the red mud composition given in Table 6 already contains at least 10% more than the amount of alumina required to generate Nepheline (NaAl SiO$_4$) on firing as the main silicate phase (no free silica).

TABLE 6

| Component | Red mud from one Brazilian Plant, % by wt | Red mud from one Japanese Plant, % by wt | Red mud from one Australian Plant, % by wt |
|---|---|---|---|
| Al$_2$O$_3$ | 17 | 21 | 23 |
| Fe$_2$O$_3$ | 50 | 35 | 35 |
| TiO$_2$ | 6 | 2 | 8 |
| SiO$_2$ | 10 | 15 | 16 |
| Na$_2$O | 4 | 9 | 9 |
| CaO | 3 | 0.5 | 2 |
| Loss on ignition at 1000° C. | 8 | 15 | 7 |
| Other | 2 | 2.5 | 0 |

What I claim is:

1. A process for producing a refractory material which is resistant to corrosion by alkaline materials and fluorides at high temperature, which process comprises:
    calcining red mud containing Bayer sodalite at a temperature in the rage of about 900° to 1400° C. for a time sufficient to remove combined water and to produce nepheline from said Bayer sodalite in said red mud;
    grinding the product following calcination to the −4 Tyler mesh range;
    mixing the ground product with a binder selected from the group consisting of silica-containing particulate materials or precursors thereof, alumina-containing particulate materials or precursors thereof, and mixtures thereof, in an amount sufficient to bind the ground product upon firing, and sufficient water to produce a formable mixture, wherein the amount of ground product and binder is such that the ratio of red mud to other ingredients is sufficient to provide a fired refractory material product which comprises at least 90% by weight of red mud, and wherein the alumina content of the ground product and binder is increased by addition so that it amounts to at least 10% more than that which becomes combined in nephaline formed in the refractory material when the alumina content of the ground product and binder is less than said 10%.
    forming the mixture into a shaped product; and
    firing the shaped product at a temperature in the range of about 900° to 1400° C. to produce said refractory material.

2. A process according to claim 1 wherein the calcination is carried out for a period of 5-10 hours.

3. A process according to claim 1 wherein the firing of the shaped product is carried out for a period of 5–10 hours.

4. A process according to claim 1, wherein the binder is selected from the group consisting of collodial silica, colloidal alumina, sodium silicate and sodium aluminate.

5. A process for producing a refractory material which is resistant to corrosion by alkaline materials and fluorides at high temperature, which process comprises:

calcining red mud containing Bayer sodalite at a temperature in the range of about 900° to 1400° C. for a time sufficient to remove combined water and to produce nepheline from said Bayer sodalite in said red mud;

grinding the product following calcination to the −4 Tyler mesh range;

mixing the ground product with a binder selected from the group consisting of silica-containing particulate materials, alumina-containing materials and mixtures thereof, in an amount sufficient to bind the ground product upon firing, and sufficient water to produce a formable mixture;

forming the mixture into a shaped product; and firing the shaped product at a temperature in the range of about 900° to 1400° C. to produce a refractory material; and wherein said binder is a silica-containing material or precursor thereof and said mixture prior to firing has a value of R in the range of $0.05 < R < 1$, wherein $$R = \frac{Na_2O}{SiO_2} \cdot S$$

and wherein:

$Na_2O$ = the molar fraction of $Na_2O$ in the product originating from the decomposition of soluble salts in the red mud during calcination and from the binder and from any additives added to said ground product;

$SiO_2$ = the molar fraction of $SiO_2$ in the product originating from the binder;

S = the ratio of specific surface area (SSA) of the calcined red mud particles to the maximum SSA value which is obtained from −65 Tyler mesh material.

6. A process according to claim 5 which further comprises exposing the fired shaped product to a sodium compound at a temperature of about 850° C. or higher.

7. A process according to claim 6 wherein the sodium compound comprises cryolite.

8. A process according to claim 6 wherein the sodium compound comprises a mixture of cryolite and NaF.

9. A process according to claim 1, wherein the calcined red mud, following grinding, contains particles in each of the following size ranges: −4+10 Tyler mesh, −10+28 Tyler mesh, −28+65 Tyler mesh and −65 Tyler mesh, said particles forming up to 37%, up to 34%, up to 27% and at least 27%, respectively, of the calcined red mud.

10. A process according to claim 1, wherein the amount of said binder mixed with said ground product is in the range of about 2 to 8% by weight solids based on the dry weight of the calcined red mud.

11. A process according to claim 1, wherein said ground product is additionally mixed with an additive selected from the group consisting of alumina, sodium oxide, aluminum fluoride, sodium fluoride, sodium carbonate and sodium sulfate in amounts sufficient to produce the formation of nepheline as the predominant silicate phase.

12. A process according to claim 1, wherein said mixture, after being formed into shaped product, is first cured by being allowed to stand at room temperature for several hours and is then dried by being heated at about 110°–120° C. for several hours, before being subjected to said firing step.

13. A process according to claim 1, wherein particles of heat-consumable material are mixed with said ground product, binder and water prior to forming said mixture into said shaped product, the amount of heat-consumable material being sufficient to increase the heat insulation of the refractory material produced by firing said mixtures compared to mixtures containing no such heat-consumable material.

14. A process according to claim 1, wherein the free silica content of the red mud is minimized by sand removal prior to said calcination step.

15. A process according to claim 1, wherein soluble basic compounds are at least partially removed from the red mud by washing prior to said calcination step.

16. A refractory material which is resistant to corrosion by alkaline materials and fluorides at high temperature, prepared by calcining red mud containing Bayer sodalite at a temperature in the range of about 900° to 1400° C. for a time sufficient to remove combined water and to produce nepheline from said Bayer sodalite in said red mud;

grinding the product following calcination to the −4 Tyler mesh range;

mixing the ground product with a binder selected from the group consisting of silica-containing particulate materials, alumina-containing particulate materials and mixtures thereof, in an amount sufficient to bind the ground product upon firing, and sufficient water to produce a formable mixture, wherein the amount of ground product and binder is such that the ratio of red mud to other ingredients is sufficient to provide a fired refractory material product which comprises at least 90% by weight of red mud, and wherein the alumina content of the ground product and binder is increased by addition so that it amounts to at least 10% more than that which becomes combined in nepheline formed in the refractory material when the alumina content of the ground product and binder is less than said 10%;

forming the mixture into a shaped product; and firing the shaped product at a temperature in the range of about 900° to 1400° C. to produce said refractory material.

17. A refractory material of low porosity which is resistant to corrosion by alkaline materials at high temperature, prepared by calcining red mud containing Bayer sodalite at a temperature in the range of about 900° to 1400° C. for a time sufficient to remove combined water and to produce nepheline from said Bayer sodalite in said red mud;

grinding the product following calcination to the −4 Tyler mesh range;

mixing the ground product with a binder selected from the group consisting of silica-containing particulate materials, alumina-containing materials and mixtures thereof, in an amount sufficient to bind the ground product upon firing, and sufficient water to product a formable mixture;

forming the mixture into a shaped product;

firing the shaped product at a temperature in the range of about 900° to 1400° C. to produce a refractory material; and exposing the fired shaped product to a sodium compound at a temperature of about 850° C. or higher;

wherein said binder is a silica-containing material or precursor thereof and said mixture prior to firing has a value of R in the range of $0.05 < R < 1$, wherein $$R = \frac{Na_2O \cdot S}{SiO_2}$$

and wherein:

$Na_2O$ = the molar fraction of $Na_2O$ in the product originating from the decomposition of soluble salts in the red mud during calcination and from the binder and from any additives added to said ground product;

$SiO_2$ = the molar fraction of $SiO_2$ in the product originating from the binder;

S = the ratio of specific surface area (SSA) of the calcined red mud particles to the maximum SSA value which is obtained from −65 Tyler mesh material.

18. A mixture suitable for shaping and firing to form a refractory material which is resistant to corrosion by alkaline materials and fluorides at high temperatures, which comprises particles produced by calcining red mud containing Bayer sodalite at a temperature in the range of about 900° to 1400° C. for a time sufficient to remove combined water and to produce nepheline from said Bayer sodalite in said red mud and grinding said red mud following calcination to the −4 Tyler mesh range; and a binder selected from the group consisting of silica-containing particulate materials, alumina-containing particulate materials and mixtures thereof, in an amount sufficient to bind said particles of calcined ground red mud upon firing, wherein the amount of said particles and binder is such that the ratio of red mud to other ingredients is sufficient to provide a refractory material product, when fired at a temperature in the range of about 900° to 1400° C., which comprises at least 90% by weight of red mud, and wherein the alumina content of the particles and binder is increased by addition so that it amounts to at least 10% more than that which becomes combined with nepheline formed in said refractory material product when the alumina content of the ground product and binder is less than said 10%.

19. A mixture according to claim 18 wherein the binder is selected from the group consisting of colloidal silica, collodial alumina, sodium silicate and sodium aluminate.

20. A process according to claim 5, wherein the ratio of red mud to other ingredients used in the process is sufficient to provide a fired refractory material product which comprises at least 90% by weight of red mud.

21. A process according to claim 5, wherein the alumina content of the mixture of the ground product and binder is increased so that the alumina content amounts to at least 10% more than that which becomes combined in nepheline formed in the product.

* * * * *